United States Patent [19]

Reinhardt et al.

[11] Patent Number: 4,889,630
[45] Date of Patent: Dec. 26, 1989

[54] FILTER BODY

[75] Inventors: Alexander-Maria Reinhardt, Stimpfach; Erich K. Reinhardt, Bietigheim-Bissingen, both of Fed. Rep. of Germany

[73] Assignee: Schumacher'sche Fabrik GmbH & Co. KG, Crailsheim, Fed. Rep. of Germany

[21] Appl. No.: 52,848

[22] Filed: May 20, 1987

[30] Foreign Application Priority Data

Sep. 24, 1985 [DE] Fed. Rep. of Germany ....... 3533924

[51] Int. Cl.⁴ ............................................ B01D 39/14
[52] U.S. Cl. .................................. 210/490; 210/504; 210/505; 210/508; 210/509
[58] Field of Search ................ 210/282, 483, 504–506, 210/508, 509, 488–492

[56] References Cited

U.S. PATENT DOCUMENTS

| 3,246,767 | 4/1966 | Pall et al. | 210/505 |
| 3,327,859 | 6/1967 | Pall | 210/502.1 |
| 3,573,158 | 5/1971 | Pall et al. | 162/131 |
| 4,032,457 | 6/1977 | Matchett | 210/505 |
| 4,528,099 | 7/1985 | Rieger et al. | 210/489 |

FOREIGN PATENT DOCUMENTS 974,891 9/1975 Canada .

OTHER PUBLICATIONS

Rausch, W., Surface Filtration Using Sinter Plate Filters in the Light of Filter and Process Optmisation, Aufbereitungs Technik Sep. 1984, pp 502–511.

Primary Examiner—Ivars Cintins
Attorney, Agent, or Firm—Wolf, Greenfield & Sacks

[57] ABSTRACT

A self-supporting composite filter for ultra filtration that can be backwashed has a central porous body which supports a thin diaphragm of fine porosity applied to the outer surface of the body. The body is porous, being formed by coarse grains and a binder. The diaphragm is thin in comparison to the filter body and is formed from a mix of fine grains, fibers and binder whose percentage composition, by volume, is in the ratio 60 to 40:40 to 20:30 to 10. The fibers are thin, 0.3 to 30 microns, and long, with a length at least 10 times their width to provide a microelasticity in the diaphragm. The absolute thickness of the diaphragm is 0.2 to 2 millimeters which is 5 to 75 times smaller than that of the support body. The ratio of the specific permeabilities of the support body to that of the diaphragm, for fluids in the laminar flow range, is between 2:1 and 100:1.

18 Claims, 1 Drawing Sheet

FILTER BODY

The invention relates to a filter body with a self-supporting, open-pored composite body comprising a support body of coarse porosity consisting of extraneously or intrinsically bonded coarse grain and a diaphragm of fine porosity containing extraneously or intrinsically bonded fine grain which is bonded to an external surface of the support body.

The invention further relates to a process for the manufacture of such a filter body wherein a thin layer of a diaphragm substance is applied to a prefabricated support body and thermally bonded to the support body.

Composite mineral membranes of hollow cylindrical, self-supporting design for ultrafine filtration are known. These consist of a rigid, double-layered, porous support body and an ultrafiltering ceramic membrane bonded thereto with ceramic material (FR-OS (French patent application) No. 2,550,953). The porous support body is comprised of particles with a size of between 4 and 20 microns; the size of the particles of the ultrafiltering ceramic membrane is between approximately 0.05 and 2 microns. To enable the fine grain to be applied to the support body of coarse porosity, it is necessary for the support member itself to be of double-layered design, i.e., an intermediate layer containing particles of a size between that of the support member of coarse porosity, on the one hand, and that of the ultrafiltering membrane, on the other hand, must be disposed on the actual support body of coarse porosity. This is a very elaborate manufacturing method which also involves the risk of the ultrafiltering membrane becoming detached from the support body when the filter body, as a whole, is subjected to high stresses, for example, by alternate heating to very high temperatures or exposure to chemical stresses.

The difficulty of cleaning the completely rigid ultrafiltering membrane has also proven disadvantageous. It is practically impossible to remove impurities which have penetrated the membrane.

Similar difficulties arise with known sinter plate filters made of plastic or metal which consist of a coarse-pored, supporting, dimensionally stable sinter body with a fine-pored membrane sintered thereon (Dr.-Ing. W. Rausch "Oberflaechenfiltration mit Sinterlamellenfiltern - Bau- und Verfahrensoptimierung" (Surface Filtration with Sinter Plate Filters - Construction and Process Optimization) in AUFBEREITUNGS-TECHNIK No. 9/1984, page 502 et seq).

Ceramic deep-bed filters with a spherical structure which may likewise be of double-layered design also exist. A coarse layer imparts the mechanical strength while a fine layer of 3 to 5 mm thickness provides for the precision of the filtration (company brochure of Krebsoege "Keramische Filter mit kugeliger Struktur" (Ceramic Filters with a Spherical Structure), publication date unknown). Here, too, there is no guarantee that the two layers will not become detached under stresses due to temperature changes such as occur, for example, in the filtration of power plant waste gases. In this case, the cleaning of the fine-pored filter layer also poses problems.

Ceramic filter bodies consisting of a coarse-pored matrix with embedded fiber flakes made from mineral fibers are known (German Patent No. 2,702,210). In these, however, the entire volume of the filter body is, in principle, of homogeneous composition, i.e., the fiber flakes are embedded in a ceramic support body with the pores being approximately the same size throughout the entire thickness of the filter body. Although improved cleaning action is attainable with filter bodies of this kind, there is a relatively high flow resistance since the filter material must exhibit comparatively small pore widths throughout the entire thickness of the filter body in order to obtain a filtration.

Finally, filter bodies are also known in which glass fibers bonded with thermosetting resin are used (company brochure of Commercial Filters Division Kennecott Corporation "Commercial Filters" form C-1078, 1980, 1981, 1982). Such filters are, however, unsuitable for high stresses, for example, very high temperatures, high temperature change stresses and certain chemical stresses. Also, there is a high pressure drop in filters of this kind since the filters must exhibit the same fine porosity throughout their entire cross section.

The object underlying the invention is to so develop a filter body of the kind mentioned at the outset that, on the one hand, the layer applied to the support body can be directly and lastingly bonded to the support body even if there is a great difference between the grain sizes in the support body and in the diaphragm, and, on the other hand, the cleaning action during the backwashing of the filter body is improved in comparison with known filter bodies.

This object is attained in accordance with the invention in a filter body of the kind described at the outset in that the diaphragm contains, in addition to the fine grain and a binder, fibers which have an absolute diameter of between 0.3 and 30 microns and a length at least ten times greater than their diameter and which are at least 10 microns long, in that the ratio of the fine grain, the fibers and the binder in percent by volume is (60 to 40):(40 to 20):(30 to 10), in that the ratio of the thickness of the support body to the thickness of the diaphragm is between 5:1 and 75:1, in that the absolute thickness of the diaphragm is between 0.2 and 2 millimeters, and in that the ratio of the specific permeabilities of the support body and the diaphragm for fluids in the laminar flow range is between 2:1 and 100:1.

It has surprisingly transpired that use of a diaphragm containing the above-stated fiber component in addition to the fine grain and the binder fully achieves the aforementioned object. The fiber addition forms in the diaphragm layer a supporting structure which is interlaced by the binder and fine grain to form a stable frame. On the one hand, the fibers prevent fine grain from penetrating the coarse pores of the support body, and, on the other hand, the free fiber ends of the diaphragm anchor it to the support body throughout the entire contacting surface. The fiber ends penetrate the coarse pores of the support body and are bonded and interlocked there with the coarse grain of the support body so that the bond between the diaphragm and the support body is maintained throughout the entire surface even in spite of very high temperature change stresses. A further advantageous effect of this fiber component is quite a substantial improvement in the cleaning action during the backwashing. It is assumed that this improved cleaning action is due to the fact that the fibers between junctions at which they are bonded to other fibers or fine grain remain flexible so that the fibers can be elastically deformed over a range of up to 50% of the maximum fiber length. This effect is referred to hereinafter as microelasticity since this elastic deformability is limited to very small areas between the junctions of the fibers. As a whole, the bonding of the fibers and the fine grain produces a rigid, non-elastic frame; the elasticity is limited to the above-described elastic fiber areas. As a result of the elastic deformation of the fibers between the points at which they are fixed, particles of dirt which have penetrated the diaphragm can be removed again relatively easily when the filter body as a whole is backwashed. Motion of the fibers enables enlargement of their spacing so that dirt particles which have become lodged can be transported back to the external surface again. The inherent motion of the fibers themselves also aids removal of lodged particles of dirt.

It has, furthermore, surprisingly transpired that use of the inventive diaphragm results in extremely high separating precision and that the total pressure drop of the filter body with the same separation precision is substantially lower than with known filter bodies of homogeneous design, for example, in comparison with a filter according to German Patent No. 2,702,210.

Accordingly, the addition of fibers to fine grain and binder in the diaphragm has a total of three essential advantageous functions, i.e., firstly net-like bridging of the orifices of the pores of the support body so that a viscous suspension forming a diaphragm can be immediately applied to this support body without clogging up the inner pores, secondly, fixing and anchoring of the diaphragm to the support body by a bonding at points to the coarse grain near the surface of the support body and, finally, imparting a microelasticity which, on the one hand, improves the cleaning action and which, on the other hand, is an essential precondition for diaphragm and support body remaining crack-free and lastingly bonded throughout the different stresses which occur.

It is particularly advantageous for the binder of the support body and the binder of the diaphragm to be identical.

The diameter of the fibers is preferably between 0.5 and 3 microns; the fiber length is preferably between 50 and 500 microns.

In a preferred embodiment, the ratio of the coarse grain to the binder in percent by volume in the support body is (80 to 90):(20 to 10), preferably 85:15.

It is expedient for the ratio of the thickness of the support body to the thickness of the diaphragm to be 10:1 and for the absolute thickness of the diaphragm to be between 0.5 and 1 millimeter.

In a preferred embodiment, the ratio of the specific permeabilities of the support body and the diaphragm for fluids in the laminar flow range is approximately 10:1.

In a particularly preferred embodiment, provision is made for coarse grain, fine grain, binder and fibers to coincide in several or all of the following properties: coefficient of thermal expansion, thermal conductivity, resistance to temperature change, swelling behavior, long-term resistance to thermal and chemical influences, aside from deviations of less than 20%.

This ensures that support body and diaphragm behave uniformly under the different conditions which occur, thereby avoiding damage and detachment. For example, when high temperatures are used, e.g. in hot gas filtration, it is imperative that the long-term resistance to chemical and thermal influences, the coefficient of thermal expansion and the resistance to temperature changes coincide within the stated range of variation.

In the gassing of liquids, for example, water or drinks, long-term resistance to chemical and thermal influences must coincide within the range of variation.

If a fluid is used, for example, in the presence of organic liquids, aqueous solutions containing an electrolyte or vapors, the swelling behavior within the range of variation is of significance.

The individual constituents of the filter body may be intrinsically bonded or extraneously bonded. Intrinsic bonding is obtained, for example, by sintering, by surface fusion, by microcrystalline growth or by chemical bonding. In this case, sintering takes place from approximately two thirds of the fusion temperature onwards, the surface fusion at higher temperatures, the microcrystalline growth at lower temperatures by diffusion.

Extraneous bonding is obtained, for example, with the material of the particles and fibers by alien ceramic bonding or adhesive-like bonding by means of plastic.

Coarse and/or fine grain advantageously consist of one of the following substances: quartz, aluminosilicate, glass, aluminum oxide, silicon carbide, carbon as graphite or activated carbon, ion exchangers, thermosetting plastics, elastomers, metals, metal alloys.

Coarse and/or fine grain may be of different configuration, for example, they may be solid pieces of irregular shape such as broken grains, cylindrical or hollow cylindrical segments, circular bodies of regular shape such as solid spheres or hollow spheres.

The fibers preferably consist of one of the following substances: quartz, aluminosilicate, glass, aluminum oxide, silicon carbide, carbon as graphite or activated carbon, ion exchangers, thermosetting plastics, elastomers, metals, metal alloys.

The following substances may be used as binder: crystalline and glass-like ceramic multicomponent compounds such as silicates, phosphates, carbides or nitrides, microcrystalline or amorphous carbon as coke, graphite or activated carbon, thermosetting plastics, elastomers.

To enlarge the surface, provision may be made for the external surface of the support body on which the diaphragm is provided to exhibit projections and recesses which are preferably parallel axial grooves.

A further object underlying the invention is to so improve a method of the kind described at the outset that the diaphragm and the support body can be lastingly bonded without using an intermediate layer.

This object is attained in accordance with the invention in a method of the kind described at the outset in that a mixture consisting of 60 to 40 percent by volume fine grain, 40 to 20 percent by volume fibers and 30 to 10 percent by volume binder is used as diaphragm substance and in that fibers are used which have a length at least 10 times greater than their diameter and which are at least 10 microns long.

The following description of preferred embodiments serves in conjunction with the drawings to explain the invention in greater detail. In the drawings.

Figure 2:
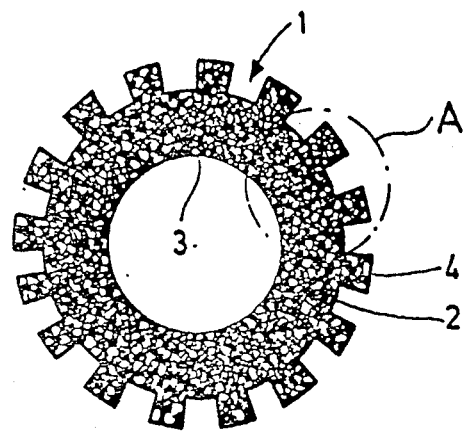
FIG. 2 is a sectional view taken on line 2—2 in FIG. 1.
Figure 1:
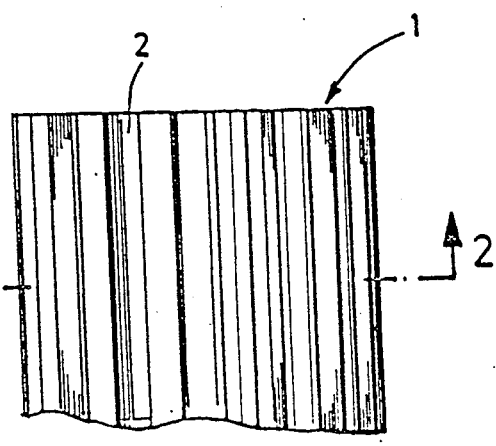
FIG. 1 is a side view, in part, of a hollow cylindrical filter body with a surface which is enlarged by axial grooves.
Figure 3:
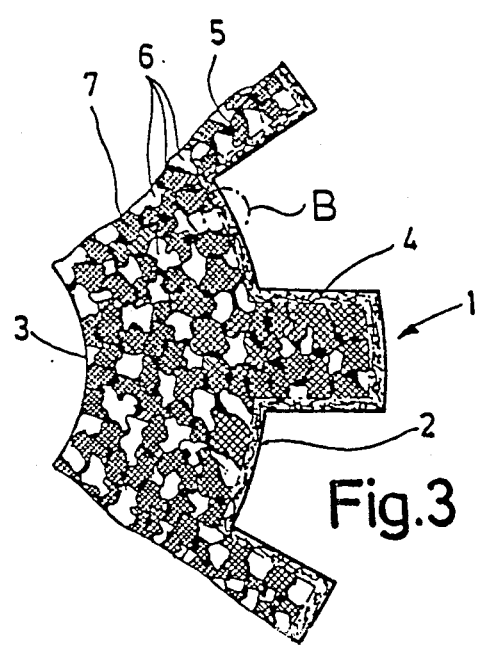
FIG. 3 is an enlarged detail view of area A in FIG. 2.

The filter body illustrated in the drawing has the shape of a hollow circular cylinder 1 and the external surface is enlarged by axially parallel grooves 2.

The circular cylinder comprises an internal support body 3 with a thin diaphragm 4 disposed on its external surface.

The support body 3 consists of a relatively coarse grain, with a granular size of, for example, 100 to 300 microns. This grain is bonded together by an intrinsically or extraneously bonding binder 5 so as to produce a structure of coarse porosity with pores 6. The support body is manufactured in a manner known per se from a mixture of binder and coarse grain by appropriate curing so as to obtain a completely homogeneous support body 3. The pores between the coarse grain particles 7 held together by binder 5 have diameters of the order of magnitude of the coarse grain particles 7, which imparts to the support body, as a whole, a high specific permeability for fluids in the laminar flow range.

The thin diaphragm 4 is disposed on the prefabricated support body. The diaphragm substance is composed of fine grain 8, a binder and fibers 9. The sizes of the fine grain 8 are, for example, of the order of magnitude of 10 to 50 microns; the length of the fibers is at least 10 times greater than the diameter of the fibers, preferably substantially greater, for example, of the order of magnitude of a factor of 500 to 1,000. The diameter of the fibers ranges between 0.3 and 5 microns and is, for example, 3 microns.

The diaphragm layer 4 is applied very thinly to the entire external surface of the circular cylinder 1; the ratio of the thickness of the support body to the thickness of the diaphragm is of the order of magnitude of 5:1 to 75:1, preferably approximately 10:1. The absolute thicknesses range between 0.2 and 2 millimeters.

Figure 4:
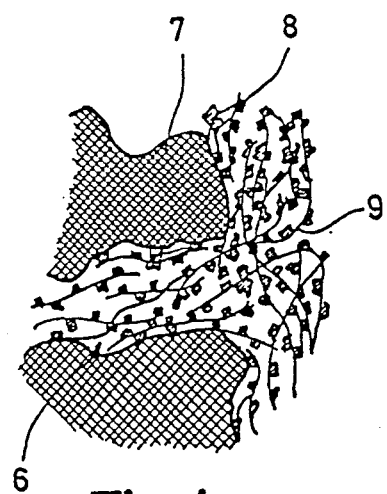
FIG. 4 is an enlarged detail view of area B in FIG. 3.

Following application of the thin diaphragm layer, it is solidified on the support body 3 by curing of the binder, in which case, the above-mentioned different bond types are to be construed by the term "curing", depending on the binder used. The diaphragm of fine porosity wherein the fine grain 8 is bonded by the binder, on the one hand, to the fibers 9, and, on the other hand, to the coarse grain particles 7 of the support body 3 (FIG. 4) is thus produced. The fibers 9 are thereby bonded together, with the binding fine grain particles 8 forming junctions or bridges. On the other hand, the fibers 9 are also bonded to the coarse grain particles 7. This produces an intimate bond between diaphragm 4 and support body 3 since this anchoring occurs not only at the external surface but also at the walls of the pores 6, as illustrated in FIG. 4.

At the same time, the fibers bridge the pores 6 and prevent the fine grain from penetrating and clogging up the interior of the pores.

Between neighboring fine grain particles 8 bonded to the fibers 9 there emerges a free fiber area in which the fibers are elastically deformable and flexible, so that the fibers can alter their mutual spacing from one another in this area. This freely deformable area may amount to 50% of the total fiber length so that microelasticity is to be observed in these orders of magnitude, while the total diaphragm layer 4 forms a rigid frame, as a whole, due to the bonding of the fine grain particles 8.

Some preferred embodiments are explained in greater detail hereinbelow:

EMBODIMENT 1:

To manufacture a support body 3, 85 percent by volume quartz sand, 50% of the quartz sand particles having a diameter of less than 120 microns, and 15 percent by volume viscous, precondensed, thermosetting phenol formaldehyde resin are extraneously bonded at temperatures between 150 and 180 degrees C. to form a rigid, homogeneous, open-pored structure.

A mixture consisting of 50 percent by volume quartz sand with a mean diameter of 15 microns, 30 percent by volume hydrolysis-resistant aluminum silicate fibers with a mean fiber diameter of 3 microns and a mean fiber length of 2000 microns, and 20 percent by volume of the same thermosetting phenol formaldehyde resin is uniformly applied in a manner known per se to the external surface of the cured support body by spreading, spraying or immersion and bonded by thermosetting, in particular, such that the ratio of the thickness of the support body to the thickness of the diaphragm is 10:1.

In the laminar flow range, the ratio of the specific permeabilities of the support body and the diaphragm for one and the same fluid is 50:1.

The thus produced diaphragm is microelastic in areas with a spatial expansion of up to 50% of the maximum fiber length. The open-pored body produced in accordance with the aforesaid criteria is particularly well suited for the filtration of gases and liquids in the pH range of 0 to 9 at temperatures up to 100 degrees C., for the gassing of liquids in the same pH range, preferably waste water, in conjunction with a fine-bubble aeration, and for the fluidization of ultrafine particulate bulk goods in the temperature range of up to 120 degrees C.

In all three examples of use, the claimed material combination is distinguished by a substantially lower susceptibility to clogging up and a considerably lower pressure loss than a single-layered, homogeneous, completely rigid structure of the same permeability.

EMBODIMENT 2:

To manufacture a hollow cylindrical support body, a mixture consisting of 88 percent by volume $\alpha$—$Al_2O_3$, 50% of the particles having a diameter of less than 350 microns, and of 12 percent by volume ceramic binder is baked, in a manner known per se, with extraneous bonding, via an intermediate form with green bond strength at temperatures between 1,200 and 1,400 degrees C. to form a uniformly open-pored molded body.

Onto this support body, a viscous thixotropic mixture consisting of 57 percent by volume $\alpha$—$Al_2O_3$, 50% of the particles having a diameter of less than 13 microns, of 25 percent by volume fibers made of $Al_2O_3$, with a mean fiber diameter of approximately 3 microns and a maximum mean fiber length of 3,000 microns, and of 18 percent by volume of the same binder as used to produce the support body is applied to the external cylinder surface of the baked support body in a manner known per se, for example, by spreading or immersion, in an even layer thickness, making use of the capillarity of the support body, dried and subsequently extraneously bonded with ceramic material to the support body at temperatures between 1,200 and 1,400 degrees C.

The thus applied microelastic diaphragm has a layer thickness of 0.2 and 1.0 mm. With a preferred thickness of the wall of the support body of 10 to 15 mm, this corresponds to a ratio of the thickness of support body to the thickness of diaphragm of 10:1 to 75:1.

The double-layered porous medium manufactured in the described manner is excellent for use at continuous operational temperatures between 600 and 1,200 degrees C. The rigid, self-supporting, purely ceramic support body of coarse porosity imparts to the total filter body a high resistance to mechanical, thermal and chemical influences and also a high resistance to temperature changes.

The filter resistance caused by the support body of coarse porosity, for example, with respect to air at room temperature is extremely low, for instance, 0.3 kPa with a wall thickness of 15 mm and a flow velocity of 5.5 cm/sec. The filter resistance caused by the diaphragm of 0.3 mm thickness which actually filters ultrafinely is approximately identical to the filter resistance of the support body, which results in a total filter resistance of approximately 0.6 kPa.

Comparable filter media consisting of a structured body of ceramic grain and fibers bonded with ceramic material, as described in German Patent No. 2,702,210, have a filter resistance which is approximately three times higher.

The diaphragm which is distinguished by an extremely high degree of separation of 99.9% for ultrafine dust particles, for example, fly ash wherein 50% of the particles has a diameter of less than 1.2 microns, constitutes a quasi-absolute filter medium which in conjunction with the very coarse-pored structure of the support body prevents deposit of ultrafine dust and, consequently, long-term clogging in the interior of the total filter body. The inherent elasticity (microelasticity) of the diaphragm which is maintained even at high temperatures ensures substantially more effective clearance of the clogging layer of dust than does a rigid filter medium.

This filter body, therefore, enables, in an exceptional way, commercially efficient ultrafine filtration of hot, corrosive and erosive gases in conjunction with automated filtering dust separators which are periodically cleanable, in accordance with the reverse air pulse principle, at temperatures of up to 1,200 degrees C.

EMBODIMENT 3:

To manufacture a hollow cylindrical support body, a mixture consisting of 80 percent by volume technical-grade coke, 50% of the particles having a particle size of less than 250 microns, and of 20 percent by volume bituminous coal tar as binder is baked, in a manner known per se, via an intermediate form with green bond strength obtained by distilling-off at elevated temperature, at temperatures between 900 and 1,100 degrees C. in reducing atmosphere with intrinsic bonding by microcrystalline growth, to form a uniformly open-pored molded body.

On this rigid molded body, a viscous, thixotropic mixture consisting of 40 percent by volume fine grain coke, 50% of the particles having a particle diameter of less than 35 microns, of 40 percent by volume carbon fiber with a mean fiber diameter of 20 microns and a mean fiber length of at least 500 microns, and of 20 percent by volume of the same binder as that used to manufacture the support body is applied to the external cylindrical surface of the baked support body, for example, by spreading or immersion, in a uniformly thick layer, making use of the capillarity of the support body, solidified by distilling-off the volatile binder constituents and subsequently intrinsically bonded to the support body at temperatures between 900 and 1,100 degrees C. in reducing atmosphere, with the remaining binder component being carbonized.

The thus applied microelastic diaphragm consisting of pure carbon exhibits a layer thickness of between 0.4 and 1.5 mm; the preferred wall thickness of the support body is about 25 mm.

The described double-layered filter medium is distinguished by excellent filtering properties, in particular, in the range of continuous operating temperatures up to 350 degrees C. in atmosphere containing hydrogen fluoride such as, for example, in the conversion of uranium oxide to uranium hexafluoride where non-converted uranium oxide is separated off by filtration.

This filter body is also distinguished by excellent filtering precision with low filter resistance, by high resistance to chemical and mechanical influences at temperatures up to 350 degrees C. and by the microelasticity of the diaphragm, which enables excellent regenerability by means of reverse air pulse cleaning.

We claim:

1. In a filter body with a self-supporting, open-pored composite body including a support body of coarse porosity consisting of extraneously or intrinsically bonded coarse grain in a binder and a diaphragm of fine porosity containing extraneously or intrinsically bonded fine grain in a binder which is bonded to an external surface of the support body, wherein the improvement comprises said diaphragm containing, in addition to the fine grain and a binder, fibers which have an absolute diameter of between 0.3 and 30 microns and a length at least ten times greater than their diameter and which are at least 10 microns long, the ratio of the fine grain, the fibers and the binder in percent by volume being (60 to 40):(40 to 20):(30 to 10), the ratio of the thickness of the support body to the thickness of the diaphragm being between 5:1 and 75:1, the absolute thickness of the diaphragm being between 0.2 and 2 millimeters, and the ratio of the specific permeabilities of the support body and the diaphragm for fluids in the laminar flow range being between 2:1 and 100:1.

2. Filter body according to claim 1, wherein the binder of the support body and the binder of the diaphragm are identical.

3. Filter body according to claim 1, wherein the diameter of the fibers is between 0.5 and 3 microns.

4. Filter body according to claim 1, wherein the fiber length is between 50 and 500 microns.

5. Filter body according to claim 1, wherein the ratio of the coarse grain (7) to the binder (5) in the support body (3) in percent by volume is (80 to 90):(20 to 10).

6. Filter body according to claim 1, wherein the ratio of the coarse grain (7) to the binder (5) in the support body (3) in percent by volume is 85:15.

7. Filter body according to claim 1, wherein the ratio of the thickness of the support body (3) to the thickness of the diaphragm (4) is approximately 10:1.

8. Filter body according to claim 1, wherein the absolute thickness of the diaphragm (4) is between 0.5 and 1 millimeter.

9. Filter body according to claim 1, wherein the ratio of the specific permeabilities of the support body (3) and the diaphragm (4) for fluids in the laminar flow range is approximately 10:1.

10. Filter body according to claim 1, wherein said coarse grain, fine grain, binder and fibers are identical in at least two of the following properties: coefficient of thermal expansion, thermal conductivity, resistance to temperature change, swelling behavior, long-term resistance to thermal and chemical influences, aside from deviations of less than 20%.

11. Filter body according to claim 1, wherein at least one of said coarse and fine grains is a substance selected from the group consisting of: quartz, aluminosilicate, glass, aluminum oxide, silicon carbide, carbon in the form of graphite, carbon in the form of activated carbon, ion exchangers, thermosetting plastics, elastomers, metals, metal alloys and mixtures of two or more of the foregoing.

12. Filter body according to claim 1, wherein the fibers are a substance selected from the group consisting of: quartz, aluminosilicate, glass, aluminum oxide, silicon carbide, carbon in the form of graphite, carbon in the form of activated carbon, ion exchangers, thermosetting plastics, elastomers, metals and metal alloys, and mixtures of two or more of the foregoing.

13. Filter body according to claim 1 wherein the binder consists of at least one of the following substances selected from the group consisting of: ceramic multi-component compounds, microcrystalline or amorphous carbon in the form of coke or graphite or activated carbon, thermosetting plastics, and elastomers, and mixtures of two or more of the foregoing.

14. Filter body according to claim 1, wherein the external surface of the support body (3) with the diaphragm (4) provided thereon comprises projections and recesses for enlargement of the surface.

15. Filter body according to claim 14, wherein the external surface comprises axially parallel grooves (2).

16. Filter body with a self-supporting, open-pored composite body including a support body of coarse porosity consisting of extraneously or intrinsically bonded coarse grain and a diaphragm of fine porosity containing extraneously or intrinsically bonded fine grain which is bonded to an external surface of the support body, the improvement comprising the ratio of the coarse grain to the binder by volume percent is (80 to 90):(20 to 10), and the diaphragm contains, in addition to the fine grain and a binder, fibers which have an absolute diameter of between 0.5 and 3 microns and a length at least ten times greater than their diameter and which are in the range of 50 to 500 microns, in that the ratio of the fine grain, the fibers and the binder in percent by volume is (60 to 40):(40 to 20):(30 to 10), in that the ratio of the thickness of the support body to the thickness of the diaphragm is between 5:1 and 75:1, in that the absolute thickness of the diaphragm is between 0.2 and 2 millimeters, and in that the ratio of the specific permeabilities of the support body and the diaphragm for fluids in the laminar flow range is between 2:1 and 100:1.

17. Filter body according to claim 16, wherein the ratio of the thickness of the support body to the thickness of the diaphragm is approximately 10:1.

18. Filter body according to claim 16, wherein the absolute thickness of the diaphragm is between 0.5 and 1 millimeter.

* * * * *